United States Patent [19]
Wilcox et al.

[11] Patent Number: 5,209,663
[45] Date of Patent: May 11, 1993

[54] CRAFT PAINT SYSTEM FOR FORMING FINE DESIGNS

[75] Inventors: Reed N. Wilcox, Littleton; Richard L. George, Englewood; William K. Thiess, Aurora, all of Colo.; John T. Loftus, Jr., Milton; Timothy F. O'Meara, Somerville, both of Mass.

[73] Assignee: The Flagship Group, Inc., Englewood, Colo.

[21] Appl. No.: 887,289

[22] Filed: May 22, 1992

[51] Int. Cl.$^5$ ............................................. G09B 11/10
[52] U.S. Cl. ..................................... 434/84; 434/81; 401/262; 524/44
[58] Field of Search .................... 434/81, 84, 95, 85, 434/96, 98; 68/200, 213; 222/566, 568, 420, 215, 575; 401/261, 262, 265, 247; 524/44

[56] References Cited

U.S. PATENT DOCUMENTS

| | | |
|---|---|---|
| Re. 31,240 | 5/1983 | Mabry . |
| 2,802,752 | 8/1957 | Wood, Jr. .................... 524/44 X |
| 2,898,019 | 8/1959 | Williams ..................... 222/568 X |
| 3,240,176 | 3/1966 | Morrison . |
| 3,248,017 | 4/1966 | Allen ............................ 222/420 X |
| 3,819,445 | 6/1974 | Devries . |
| 3,972,284 | 8/1976 | Bell . |
| 3,979,844 | 9/1976 | Smith . |
| 4,075,962 | 2/1978 | Mabry . |
| 4,189,857 | 2/1980 | Fujisawa . |
| 4,239,011 | 12/1980 | Schultz . |
| 4,310,313 | 1/1982 | Brundige . |
| 4,495,230 | 1/1985 | Ellwein . |
| 4,496,510 | 1/1985 | Hanson et al. . |
| 4,836,381 | 6/1989 | Edwards et al. . |
| 4,917,274 | 4/1990 | Asa et al. .......................... 222/420 |
| 4,953,370 | 9/1990 | Hambright . |
| 5,106,305 | 4/1992 | Grant . |

FOREIGN PATENT DOCUMENTS 482552 7/1953 Italy .................................. 222/568

OTHER PUBLICATIONS

Country Cradle Brochure, County Cross-Stitch, Inc., Joyce C. Bailey, 1979.
"Sweatshirt Stitchin'", Banar Designs, CL-86, 1988 Banar Designs.
Delta Technical Coatings, Inc. advertisment.
Lee Riggins-Hartman, "Our Wedding," Bridal Crafts, Summer 1992.

*Primary Examiner*—John J. Wilson
*Assistant Examiner*—Jeffrey A. Smith
*Attorney, Agent, or Firm*—Dorr, Carson, Sloan & Peterson

[57] ABSTRACT

A craft art form and system including patterns, paint, and applicators enables craft paint to form three-dimensional color dot matrix patterns having high degree of visual resolution and color saturation. Precisely located and closely spaced circles containing a standard set of color symbols are used to form designs in patterns. Each symbol in the standard set of symbols of the present invention represents an artistic expression which is permanently assigned to a particular color. Each color symbol has a darkness value which corresponds to the darkness value of the assigned color. The craft paint has the characteristics of forming a discrete uniform, homogeneous, three-dimensional bead to overlay the color symbol placed on each circle. This special beading paint can form beads placed very closely together (36 to 81 beads per square inch) without running together, yet retain sufficient fluidity to settle into smooth, substantially rounded, uniform beads. A fine tip applicator applies the paint to the center of each circle. The paint is applied in a laminar fashion without turbulence so as to ensure the uniformity and homogeneity of each bead. The paint applicator is stored in an inverted position to minimize the formation of air bubbles in the craft paint.

10 Claims, 12 Drawing Sheets

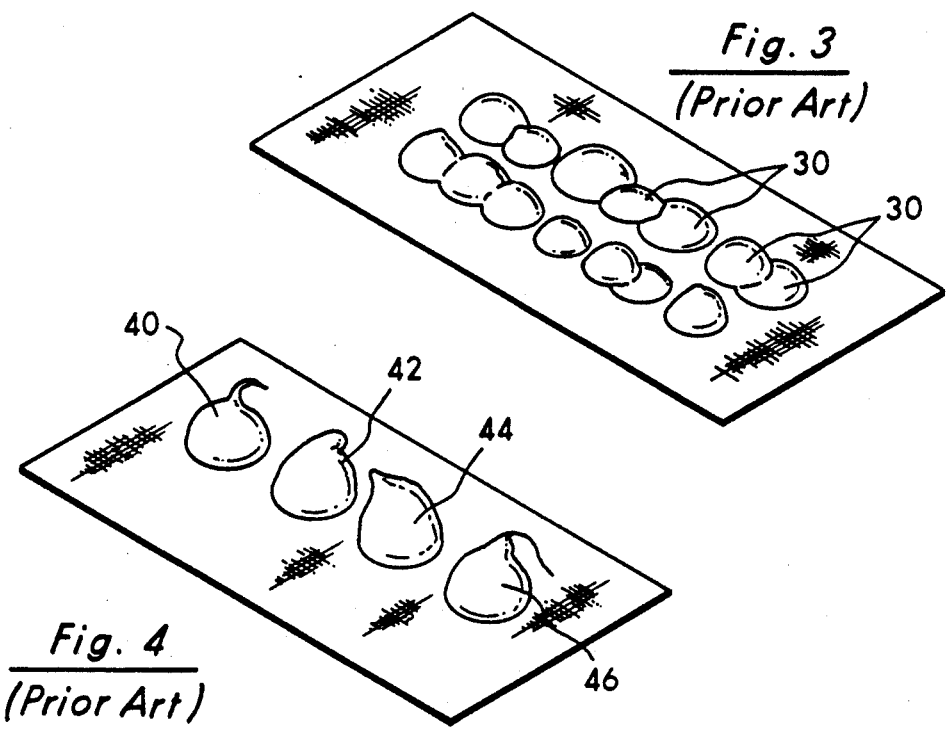
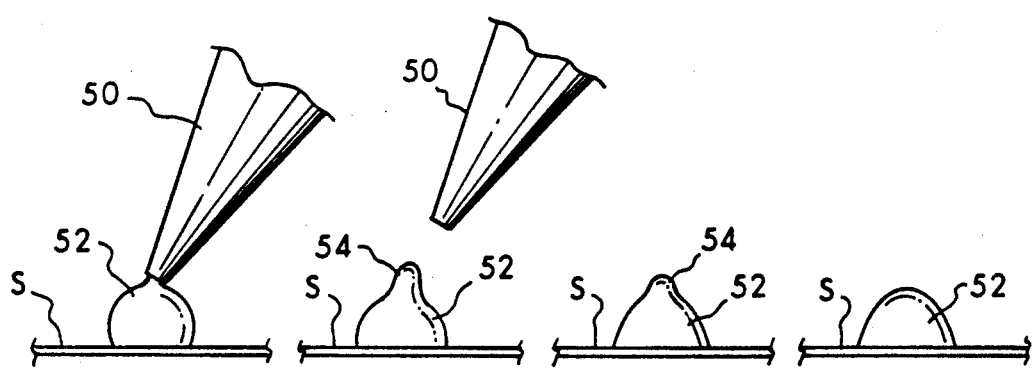
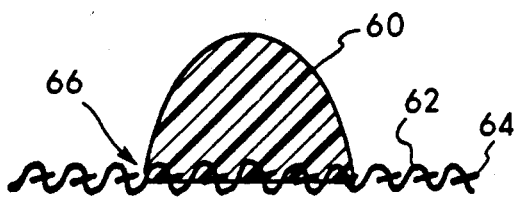

- ▼ LIGHT BLUE
- ▼ MEDIUM BLUE
- ⊡ PINK
- ⊙ PURPLE
- ▨ LIGHT GREEN
- ◪ DARK GREEN
- ■ BLACK

© 1988 Banar Designs
Reprinted with Permission

Fig. 12

- 80 — ⓥ Light Pink
- 84 — ⊖ Rose Petal
- ⊕ Strawberry
- ◐ Cranberry
- ⊘ Poppy Red 86 {
- ⊘ Lemon Yellow
- ⊕ Sunflower
- ③ Buttercup
- ⊕ Tangerine
}

- ① Ivory
- ○ Snow White

- ⊙ Slate
- ◐ Pewter
- ● Black

- ⊖ Butterscotch
- ◎ Toffee
- ⊖ Mocha
- ◐ Cocoa

- ◔ Lilac
- ⊖ Deep Lilac
- ◐ Periwinkle

- ◡ Baby Blue
- ⓪ Light Wedgewood
- ◓ Wedgewood
- ◑ Cornflower
- ◉ Royal Blue
- Ⓝ Navy Blue 88 {
- ◎ Spring Green
- ⊕ Celery
- ○ Avocado
- ⊕ Bright Green
- ⊖ Forest Green
}

- ▽ Light Turquoise
- ⊕ Turquois

- ✪ Gold
- ⓐ Antique Gold
- ⊕ Copper

- ⊖ Light Beige
- ◔ Peach
- ◑ Salmon

- ⊗ Dusty Rose
- O Antique Rose

© 1992 Flagship Group, Inc.

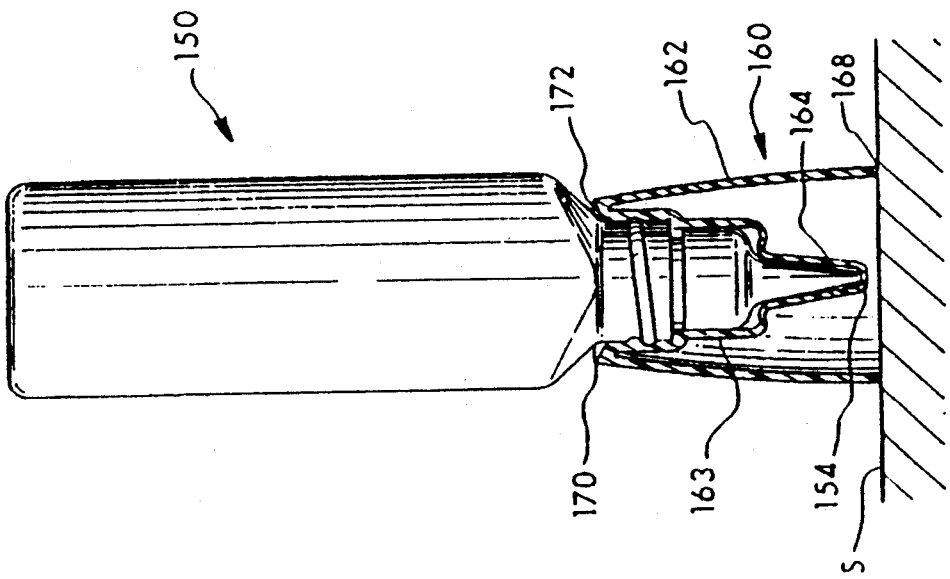
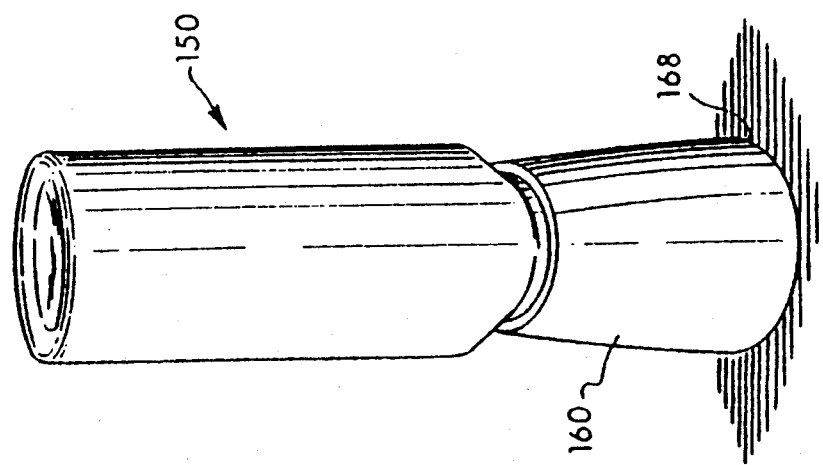

CRAFT PAINT SYSTEM FOR FORMING FINE DESIGNS

BACKGROUND OF THE INVENTION

1. Related Inventions:

| TITLE | SER. NO. | FILING DATE |
|---|---|---|
| Fine Point Tip Applicator For Craft Paint | 07/888,055 (pending) | May 22, 1992 |
| Inverted Cap For Craft Paint Applicators | 07/888,552 (pending) | May 22, 1992 |
| Self Adjusting Soft Seal Cap For Fine Point Craft Paint Applicators | 07/888,059 (pending) | May 22, 1992 |
| Craft Paint For Forming High Resolution Designs | 07/887,699 (pending) | May 22, 1992 |

2. Copyright Authorization:

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

3. Field of the Invention:

The present invention relates to the field of providing stylized decorative designs on surfaces, and particularly to the field of craft paints for forming painted designs with hand-applied, color dot matrix patterns of three-dimensional beads of paint closely spaced together to visually merge to form designs of lines or fields of color.

4. Statement of the Problem:

There is great consumer interest in forming decorative designs on surfaces. These surfaces include such application surfaces as fabrics, wood, leather, vinyl, and painted and other surfaces. Conventional decorative designs include needlecraft (such as embroidery) on fabric surfaces, dyeing threads on a fabric surface, and craft painting on a variety of surfaces. Each of these techniques enjoy certain advantages as well as suffer from certain disadvantages.

a. Needlecraft Embroidery

A popular technique for creating a stylized decorative design on fabric surfaces is needlecraft embroidery. Needlecraft embroidery includes needlepoint, candlewicking, embroidery, cross-stitching, etc. Needlepoint stitching is embroidery worked over or on a fabric in simple even stitches across counted threads. Cross-stitching is similar to needlepoint but includes any needlework stitch that forms an "X" or cross. Needlepoint and cross-stitching, historically, are favored by many people since they provide an elegant, fine, textured appearance on textile surfaces, whether the textile surface is in the form of apparel or in an embroidered artwork or craftwork.

Typically, needlepoint consists of 11 to 24 stitches across a corresponding 11 to 14 thread count textile material. Thread counts are defined by the number of threads per inch. Needlepoint and cross-stitching provide a dimensional perspective to the textile surface, particularly when the color of the stitching is varied from the background textile surface and from adjacent stitching. Needlepoint and cross-stitching are usually performed according to a pre-designed pattern which serves as a guide for forming the final needlecraft design. The pattern is generally laid out in a grid array of squares with the squares appropriately marked according to the particular color, thread or stitch to be used. The threads on the textile surface are counted according to the pattern and the appropriate stitch is applied. Needlepoint and cross-stitching according to the pattern provides an appearance exhibiting texture and structure so as to create an elegant colored impression on the textile background. The skill necessary to perform needlecraft can usually be acquired with repetition. Little creativity is required for needlecraft since the design is applied according to a selected pattern.

However, needlecraft is intensively time-consuming and laborious. A typical needlecraft pattern may require from ten hours to over a hundred hours to finish. Additionally, needlepoint is generally limited to a finite number of available patterns. The patterns used in needlecraft are generally expensive to create and also difficult to reproduce onto the textile surface. The use of these patterns limits expressions of individual creativity. The range of textile materials on which needlecraft can be applied is also limited to textile materials having a thread count in the range of approximately 11 to 24. This count range is necessary to provide a sufficient substrate for the needlepoint and cross-stitch stitches.

Thus, while needlecraft provides an elegant colored appearance on fabrics with only a minimal amount of skill, the disadvantages associated with needlecraft limit the use of needlecraft. These disadvantages include a limited number of surfaces on which needlecraft can be applied and, in particular, the amount of time necessary to create a needlecraft design.

b. Thread Dyeing

Another technique for creating a design on a fabric surface is by dyeing individual threads on the fabric surface. This technique uses a marking instrument constructed to dye individual yarn loops in an array of loops. Single loops of the material are dyed according to a code on the pattern. The tip of the marking instrument requires a single loop to be received within a recessed loop where the single loop is dyed. This technique is designed to simulate needlepoint by dyeing each thread. This technique is still time-intensive and limited to use on specific materials. The design created by this technique is a flat, two-dimensional, colored design.

c. Craft Painting

Craft paints are widely used since a colorful design can be created in a minimum amount of time on a variety of surfaces. In craft painting, the design is not usually limited to a pattern since normally the design is quickly painted in a free hand style. The free hand style design can thus be creative and colorful.

When no patterns are used in creating a craft painted design, the user must possess some degree of creative ability as well as artistic technique. This intimidates most users from attempting to create a detailed design, especially fine designs. Patterns that have been used with craft paint are tracing patterns, much like children's coloring books. The designs are simply "colored" in by staying within the lines.

A need exists for a new craft that utilizes craft paint to create finely-detailed mosaic patterns or dot matrix designs similar to cross-stitching or needlepoint designs. This new craft requires the craft paint to be formed in stylized, three-dimensional color dot matrix decorative designs for application on a wide variety of surfaces.

i. Problems with adapting prior craft paint to fine three-dimensional designs

In order to create a finely detailed, textured appearance such as found in needlecraft, it is necessary that the craft paint, upon application, form discrete, closely spaced, rounded beads having distinct three-dimensionality. The beads should also be uniform and homogenous in shape and size. This is contrary to the qualities of conventional craft paints. Some conventional craft paints fail to form stable, individual, discrete beads of paint. Rather than forming beads, the paint tends to coalesce or run together, especially if spaced more closely together. Other beads formed of conventional paint flatten out on the surface to form dots. Hence, these types of craft paint tend to diffuse into a continuous surface upon application, thus having no discrete height dimensionality, no uniformity and no homogeneous shape. Other prior craft paints tend to be so viscous that nonhomogeneous, nonuniform lumps of paint are formed. These lumps tend to have irregular shapes such as tear drops or conical shapes with extended curlicues or strings as the paint is applied. Such beads have irregular shapes that are especially dependent upon the angle and technique of application. Such highly viscous craft paints are unable to achieve finely detailed appearances.

A need exists for a paint system having a craft paint that upon application consistently provides discrete, rounded, uniform, and homogeneous three-dimensional beads that can be closely spaced so as to merge visually to form lines or solid fields of color exhibiting a high degree of visual resolution and color saturation.

ii. Problems with applying craft paints to patterns

Another disadvantage in craft painting is the lack of detailed patterns for the application of the design. Normally, the craft paint is applied in a free hand fashion. This allows creativity in applying the design. If patterns are used, the conventional patterns are coarse and without fine detail. Many people lack the skill necessary to create an elegant structured design, especially a design having fine details similar to needlecraft designs.

Needlecraft such as needlepoint or cross-stitching provides users with finely detailed square grid patterns to follow which enable even unskilled people to create fine designs. Needlecraft requires complicated patterns to be created involving coded symbols. These patterns are typically provided on a square grid scale with the different symbols used for different colors of thread in the design. These patterns are then carefully followed by the user as a map to stitch a desired design. Each square represents a stitch and each symbol represents a color. The lines of the grid represent threads in the weave of the fabric and the user must actually count the threads in the fabric corresponding to the grid. This is laborious and time consuming.

The prior needlecraft coding patterns used symbols having a darkness value to generally indicate the designs on a pattern. The use of such symbols allows the designs to be easily interpreted. However, there is no uniformity in the coding symbols used to identify the colors of each respective pattern. Even the same artist, creating two different patterns, may use different symbols for the same colored thread. This is in part due to the necessity of providing adequate shading on the symbol so that the design is recognizable. This requires both the artist to create, and the user to relearn, a different coding pattern for every design created and used.

Also, it is complicated to learn and relearn new codes with each new pattern to match the appropriate color of thread used in a pattern since the codes refer to different shades in each new pattern.

A need therefore exists for craft paint system patterns for use by craft paint users that: provides the same color coding scheme, provides a coding scheme easily followed by users, provides for many different colors and provides for symbols having darkness values that correspond to the darkness values of the paint colors used.

iii. Problems with prior craft paint applicators

The prior craft paint applicators generally either have a relatively large conical applicator tip or a long tubular applicator tip. Neither tip is suited for fine application of craft paint. Each of these prior craft paint applicator tips have problems associated therewith.

The conical applicator tips are adequate for use in forming continuous lines. These applicator tips are cut off to allow paint to dispensed. The tips are often cut off unevenly which affects the amount of paint flow being dispensed. Paint residue in such tips will dry and may create obstructions which detrimentally affects consistent application of the paint. Also, conical tips have relatively thick sidewalls which cause the paint to be applied in larger diameter flows. The craft paint application tends to be in a relatively large, turbulent flow which is satisfactory for gross free hand application but is not suited for fine, controlled application. Also, the relatively large size of the conical tips tend to obscure the line of sight of the craft paint application.

Tubular tips are finer and provide an improved line of sight. Tubular tips, however, have high flow resistance due to the shear forces incurred by the paint flow through the long tubular orifice of the applicator tip. This detrimentally affects the characteristics of the craft paint as well as increases the pressure necessary to force the craft paint through the applicator, thereby causing hand fatigue. Also, tubular tips tend to be susceptible to clogging.

A common problem occurs in use of both of the conventional types of applicator tips. Air bubbles are formed in the conventional applicators by the movement of air pockets through the craft paint as the applicator is inverted. These air bubbles then disrupt the flow of the craft paint. This disruption causes the flow to become turbulent within the applicator tip. Moreover, the air bubbles will "spit" or "pop" as the craft paint flows out of the applicator tip and on to the application surface. The uniformity of the craft paint beads is greatly affected by these air bubbles.

A need therefore exists for a craft paint system having a fine applicator tip (i.e., an outside diameter less than about 0.060 inches) and thin sidewalls (i.e., less than 0.015 inches in thickness). A need exists for a tip which is not susceptible to clogging and which provides a clear line-of-sight. A need exists for a tip that substantially eliminates turbulence and which minimizes shear so that less hand fatigue is encountered in the application of the paint. Finally, a need exists for a craft paint system capable of minimizing the formation of air bubbles in the craft paint flow in order to reduce the disruption of designs and to reduce turbulence in the craft paint flow.

5. Discussion of Prior Art:

One prior art attempt to create a dyed color matrix decorative design is disclosed in U.S. Pat. No. 4,953,370, issued to Hambright. This patent discloses a technique of thread-dyeing, discussed above. This particular technique uses a cut-out frame on which a special fabric is mounted. The individual loops of yarn of this fabric are then dyed to match a pattern code. The dyeing technique uses a special marking instrument which has a recessed nib. The individual loops of yarn are each inserted into the recessed nib. A marking tip contacts the individual loop of yarn in the nib to dye that particular loop. This technique is relatively time-intensive and limited to use on specific materials. The design created by this technique is a flat, two-dimensional, colored design.

6. Solution to the Problem:

The present invention provides a novel solution to the above identified problems as well as creating an entirely new craft art form. A new craft art form and system is created which enables a novel craft paint and applicator to be utilized to form, quickly and easily, fine three-dimensional color dot matrix design work similar to needlecraft. This formation occurs without the lengthy time periods needed to create needlecraft and without the artistic ability generally necessary to properly use craft paint in a free hand style.

To overcome the problems associated with the above prior art approaches and in order to create a new craft paint art form, the system of the present invention utilizes individually designed color-coded dot matrix patterns. These patterns are made up of precisely located circles having a preferred density of circles per inch (or per square inch) wherein the circles are spaced closely together within a predetermined distance to form designs in patterns. Unlike needlecraft grids of adjacent, contiguous squares, the circles of the present invention do not touch each other. The circles of the present dot matrix pattern are not limited to a perpendicular grid array, so that the present invention can use circles in curvilinear relationships and in nested arrays. The latter two formats allow artists creating designs for patterns of the present invention to have significantly more freedom in creating fine elegant designs than heretofore presented by needlecraft patterns.

A standard set of color symbols created under the teachings of the present invention provides universality to the new art form. Only one set of color symbols is memorized either by the artist creating the designs or by the users in painting the designs. This greatly simplifies the process of creating patterns for new designs and the painting of these patterns by the user. This is significantly advantageous when compared to needlecraft wherein not only do color symbols for the grids vary from artist to artist but even the same artist may use different color symbols in his or her designs.

Each symbol in the standard set of symbols of the present invention represents an artistic expression which is permanently assigned to a particular color. Each color symbol has a darkness value which corresponds to the darkness value of the assigned color. Hence, a darker green would have a symbol with a darker value than the symbol for a light green or even a symbol for a light pink. The color symbols of the present invention, when used by the artist creating the design in the patterns, provide a pattern that the user can view to quickly perceive the design (in black and white shades). In addition to the darkness value corresponding to the darkness value of each assigned color, the shades of a particular color (i.e., the shades of green) use color symbols with distinctly different expressions. This is an important feature of the present invention in that the user, when painting the design of the present invention, becomes quickly aware that a new shade of a particular color is being utilized.

Since there is a standard set of color symbols, the craft paint can be sold in applicator bottles utilizing the color symbols on the bottles or on the packaging associated therewith. This greatly simplifies the use of the craft paint system of the present invention by the user. In other words, the craft painting system of the present invention provides a format for the user to accurately recreate the intended effect by the artist of the design. The color symbols are placed precisely within each circle of the pattern.

Another aspect of the present invention is the composition of the craft paint and the characteristics of the applicator tip. The craft paint of the present invention has the characteristic of forming a discrete uniform, homogeneous bead to overlay the color symbol on the circle. Hence, the applied bead of paint covers the circle and the symbol so that the pattern is no longer visible, and also forms a substantially hemispherical bead of paint on the circle. The bead of paint provides a height dimension to the final design which more closely corresponds to some form of needlecraft work with upstanding threads (e.g., needlepoint) than to craft paint work wherein the craft paint lies in contour lines of color upon the surface. The craft paint of the present invention can quite easily be applied so that it stays within the confines of the circle. The craft paint does not tend to run or bleed outwardly after application. Additionally, the craft paint is not so viscous that curlicues or strings are formed. Rather, upon application, the craft paint beads so as to form a smooth rounded upper surface despite various angles of application. The paint can be applied to most surfaces such as fabric, paint, wood, leather, etc. Hence, the paint of the present invention, when applied to the color coded circles, provides a dimensional or textured look to the artist's design. High color saturation or color brilliance is achieved by the visual density or close proximity to the beads and by the height dimension.

In order to effectively apply craft paint of the present invention to the symbol coded circles of the present invention, a fine tip applicator was created to apply the paint to the center of each circle. The paint is applied in a smooth laminar flow without turbulence so as to ensure the uniformity and homogeneity of each bead. The applicator of the present invention requires a fine tip having a dispensing dimension much finer than that found in conventional craft paint applicators.

The craft paint system also includes a cap which serves as a base for holding the craft paint applicator in an inverted position. This inverted position keeps the craft paint in fluid contact with the inner walls of the applicator tip. The inverted position also keeps any air pockets away from the applicator tip to minimize the formation of air bubbles.

Hence, the new craft paint art form and system of the present invention overcomes all of the above problems and provides significant other advantages that have resulted in an entirely new craft art form. While similar in some aspects to the textured effect created by needlecraft, the system is approximately 10 times faster to apply, can be used with a much broader range of fabrics, and significantly expands upon the design possibilities over needlecraft. The craft paint system of the present invention, for the first time, enables consumers who are adept at fine needlecraft work, but lacking the artistic skills associated with free style craft paint, to create three-dimensional color dot matrix images. Images are formed by substantially round colored beads of craft paint spaced closely together to merge visually into solid lines or fields of color having a high degree of resolution and color saturation.

These and other features of the present invention will be evident in the ensuing drawings and description.

SUMMARY OF THE INVENTION

A novel craft art form and system is created which enables a novel craft paint to be utilized in fine three-dimensional color dot matrix design having a high degree of visual resolution and color saturation without the lengthy time periods needed to create prior art matrix pattern designs such as needlecraft and without the artistic ability generally necessary to properly use craft paint in a free hand style. The system of the present invention utilizes a uniquely formulated beading craft paint. The uniquely formulated craft paint has special flow and beading characteristics that form beads precisely positioned on precisely located circles having a preferred density of 36-81 circles per square inch wherein each circle is closely spaced by a predetermined distance to form designs in patterns. The present invention uses circles in straight and curvilinear lines and in regular and nested arrays.

A standard set of color symbols created under the teachings of the present invention provides universality to the new art form of the present invention. Only one set of color symbols ever needs to be memorized either by the artist creating the designs or by the users in painting the designs. Each symbol in the standard set of symbols of the present invention represents an artistic expression which is permanently assigned to a particular color. Each color symbol has a darkness value which corresponds to the representative darkness value of the assigned color. Hence, the color symbols of the present invention, when used by the artist creating the designs in the patterns, provide a pattern that the user can view to quickly perceive the design (in black and white shades). In addition to the darkness value corresponding to the darkness value of each assigned color, the shades of a particular color use color symbols with distinctly different designs.

Since there is a standard set of color symbols, the craft paint can be sold in applicator bottles utilizing the color symbols on the bottles or on the packaging associated therewith. This greatly simplifies the use of the craft paint system of the present invention by the user. The craft painting system of the present invention provides a format for the user to recreate precisely the intended color effect by the artist of the design.

The craft paint of the present invention has the characteristics of forming a discrete, uniform, homogeneous bead to overlay the color symbol on the circle. The applied bead of paint covers the circle and the symbol so the coding pattern is no longer visible. The craft paint also provides a substantially hemispherical bead of paint on the circle. Upon application, the craft paint beads so as to form a smooth rounded upper surface despite various angles of application. These beads can be placed very closely together (36-81 beads per square inch) without running together, yet retain the ability for individual beads to coalesce into a smooth, rounded, substantially uniform bead. The paint of the present invention, when applied to the color coded circles, provides a textured look to the artist's design having a high degree of visual resolution and color saturation.

In order to effectively apply craft paint of the present invention to the symbol coded circles of the present invention, a fine tip applicator was created to apply the paint to the center of each circle. The paint is finely applied in a laminar fashion without turbulence so as to ensure the uniformity and homogeneity of each bead. The applicator of the present invention requires a fine tip having a dispensing dimension much finer than that found in conventional craft paint applicators.

The applicator system also includes a holder for storing the applicator in an inverted position. This inverted position keeps the craft paint in fluid contact with the inner walls of the applicator tip thus substantially reducing tip clogging due to drying of paint in the tip. The inverted position also keeps any air pockets away from the applicator tip so that air bubbles are minimized. The craft paint flow is thus not disrupted by air bubbles in the applicator tip.

The system of the present invention allows a user to create color dot matrix patterns formed of three-dimensional, uniform beads that visually merge to form lines or fields of color having a high degree of visual resolution and color saturation.

BRIEF DESCRIPTION OF THE DRAWINGS

FIG. 3 illustrates the creation of irregularly shaped, substantially flat dots which have run together, such as are created by many prior art paints.

FIG. 4 illustrates three-dimensional irregularly shaped beads having substantial curlicues and strings created by other types of prior art paint.

FIG. 5(a)-5(d) sets forth the steps which occur in the creation of the smooth homogeneous bead of the present invention.

FIG. 6 is a cross section of a discrete uniform, homogeneously shaped bead of the present invention engaging the fabric surface.

FIG. 7 is a cross section of a discrete uniform, homogeneously shaped bead of the present invention on a rigid surface.

FIG. 12 sets forth the color symbols used under the teachings of the present invention.

FIG. 18 illustrates the holder of the present invention for maintaining the applicator in an inverted position.

FIG. 19 illustrates a cross-sectional view of the holder of FIG. 18.

DETAILED DESCRIPTION OF THE PREFERRED EMBODIMENT

1. General Overview:

The present invention provides a craft art system for quickly and easily creating stylized three-dimensional color dot matrix designs having a depth of perception and a high degree of visual resolution and color saturation. Using this system, attractive designs can be completed at a rate of 2 to 3 minutes per square inch, compared to at least twenty to thirty minutes per square inch for prior art matrix pattern crafts, such as needlepoint or cross-stitch. An element of height on the design elements is necessary to create the perception of a structured, textured look rather than a flat two-dimensional appearance. The craft art system does so by providing a plurality of components that combine to allow the creation of discrete, uniform, three-dimensional beads precisely spaced to form a color dot matrix pattern. The pattern is formed by positioning substantially smooth rounded beads of craft paint closely together which visually merge to create an appearance of solid lines or fields of color having a high degree of visual resolution and color saturation.

One feature of the system is the ability to create uniform, discrete beads of craft paint. These beads are spaced closely together (36-81 beads per square inch), yet do not run together. The beads retain enough fluidity so that the individual beads still coalesce into smooth rounded shapes. If the beads run together, the attractiveness of the design is lost, the features of the design are blurred, and the appearance of dimensionality is lost. If the beads are nonuniform in size, shape or spacing, the patterned look is lost. This is analogous to a forest and trees example. If the trees in the forest are all uniformly spaced and sized, then an observer from above will see a textured pattern formed by the trees (i.e., sees the forest). However, if some trees are different in size than the surrounding trees or have different spacing, the observer will focus on the individual trees.

Figure 1:
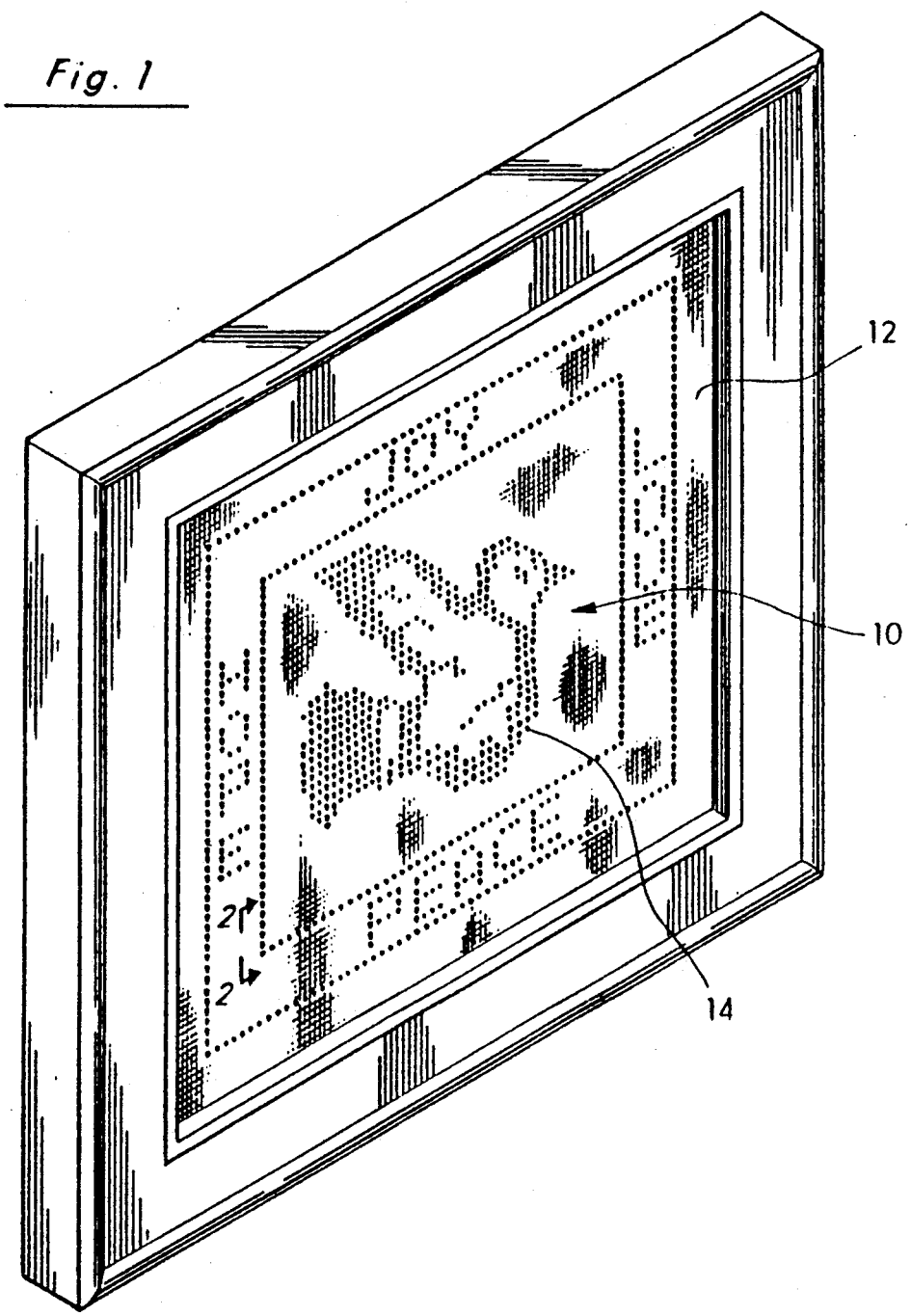
FIG. 1 sets forth an illustration of a pattern containing a three-dimensional design created by the craft paint system of the present invention.

The system of the present invention allows a user to create a stylized three-dimensional color dot matrix design having a patterned textured appearance with a high degree of visual resolution, such as design 10 in FIG. 1. Design 10 includes a plurality of discrete beads 14 affixed onto a surface 12. While the surface 12 is indicated as fabric in FIG. 1, the design can be created on a wide variety of surfaces, including leather, vinyl, wood, painted and other surfaces. Needlecraft is well suited for special fabric having 11 to 24 thread counts per linear inch. Such special fabric is typically used for wall hangings or appliques, but is not well suited for application to normal fabrics used for most home decor items or clothing. Most fabrics, designed for everyday use, have thread counts much too high for use with needlepoint or cross-stitch. In contrast, the coded pattern of the present invention can be easily transferred to virtually any fabric used for clothing or home decor items.

Figure 2A:
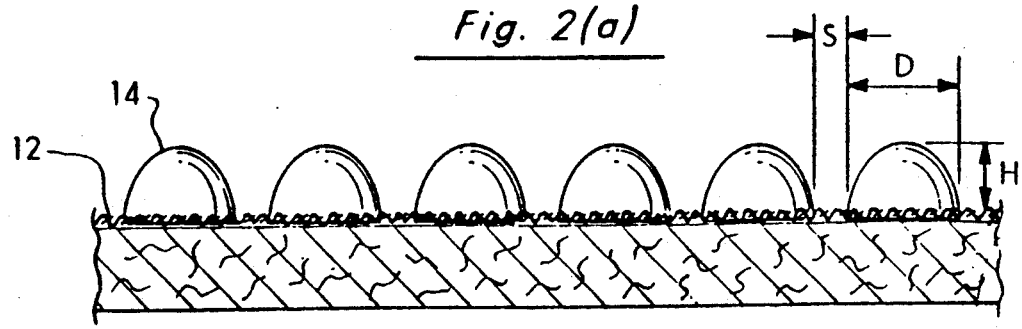
FIG. 2(a) sets forth a side view illustration of a plurality of discrete uniform, homogeneous three-dimensional beads created by the craft paint system of the present invention.
Figure 2B:
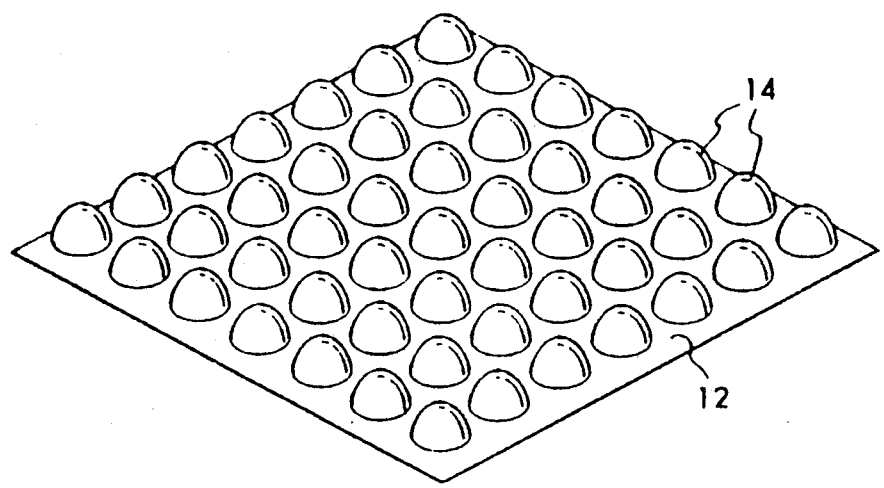
FIG. 2(b) sets forth a perspective view illustration of the beads illustrated in FIG. 2(a).

As illustrated in FIGS. 2(a) and 2(b), design 10 is created by discrete, uniformly sized and spaced beads 14. Each of the beads 14 have a uniform homogenous shape, as shown in FIG. 2(a) and 2(b), to provide a three-dimensional, textured appearance. The term "uniform" as used herein refers to beads 14 having the substantially same smooth rounded shape. Each bead 14 has a height "H", a diameter "D" and a spacing "S". The term "homogeneous" as used herein refers to beads of generally the same dimension (i.e., H and D). The term "spaced" refers to the spacing S. The term "discrete" refers to the physical integrity of each bead without touching or blending with another bead. It is to be expressly understood that the beads vary dimensionally from individual application to individual application, but conform to the aforesaid designed characteristics.

The system of the present invention creates designs 10 by using several components such as: craft paint having distinctive beading and flow characteristics, a uniform color coding scheme and unique circular pattern structure for a stylized design, a fine tipped applicator for applying the craft in small, discrete beads not susceptible to disruptions in the craft paint flow on the pattern, and a holder for storing the applicator in an inverted position to minimize the formation of air bubbles in the craft paint flow.

The craft paint of the present invention provides a discrete bead 14 forming a rounded, smooth shape with regularity. The craft paint stabilizes without interfering with adjacent beads while remaining fluid enough to form discrete uniform, homogenous three-dimensional beads.

The coding pattern of the present invention provides a transfer surface having an array of circles to form a desired design in the pattern. The arrayed circles are precisely sized and spaced to provide the desired color saturation for the design. The use of circles rather than squares is unique. It provides a guide for application of round beads of paint. It also allows the beads 14 to be applied in a smooth curved pattern rather than the traditional stair step pattern of needlecraft. The need for a needlecraft-type grid is eliminated.

An important feature of the coding pattern is the use of a uniform set of color symbols. Individual color symbols are displayed within each circle of the pattern to identify the appropriate color to be applied for the desired design. The symbols have darkness values corresponding to the darkness values of the assigned colors.

The craft paint is applied onto the coding pattern by a fine-tipped applicator of the present invention. The applicator provides a fine tip to improve the line of sight for applying the craft paint onto the coding pattern. The fine-tip is designed to provide a smooth laminar flow without being susceptible to clogging. The holder stores the applicator in an inverted position so the applicator is not susceptible to air bubbles in the paint flow. The applicator is designed so the designs can be quickly and easily created with little hand fatigue.

Each of these system components is discussed in detail below. The system of the present invention provides an efficient process for creating stylized three-dimensional color dot matrix designs. Taken together, the components of the system will permit design completion at a rate of 2 to 3 minutes per square inch compared to at least 20 to 30 minutes per square inch for traditional needlecrafts such as cross-stitch or needlepoint. The efficiency of the process is important in allowing a sense of accomplishment and aesthetic pleasure in seeing the design take shape.

2. Craft Paint:

Beads created by prior art craft paints are illustrated in FIGS. 3 and 4. Typically prior art craft paints tend to be of two general types. As shown in FIG. 3, some prior art craft paints create beads 30 which tend to run together and, thereby, lose the "discrete" bead quality depicted in FIG. 2 as well as the "uniform" shape and size. The results of using the second type of prior art craft paints are shown in FIG. 4. These paints are too viscous. Therefore, the beads 40, 42, 44, 46, created by these high viscous paints tend to form beads with non-homogeneous, nonhemispherical shapes. In general the beads created by such viscous paints form shapes such as tear drops 42, 44 or conical shapes 40, 46 which trail off into extended curlicues. The beads tend to string out as the paint is applied, causing deformation of the beads. Thus, both of these types of prior craft paints are unable to form the uniform, homogenous, three-dimensional, discrete beads which are needed to form a design with a high quality, high visual, high resolution appearance.

Moreover, because bead forming properties have not been important in craft paints, prior art paints have not been designed to have consistent viscosity across the range of a color line. In other words, when different colors of a given prior art craft paint are used to form beads, one color might be too runny while a second color might be too viscous. As a result, there are no prior art craft paints with an adequate range of colors that exhibit the beading qualities of FIG. 2 which are necessary to form attractive three-dimensional color dot matrix designs of FIG. 2.

The craft paints of the patent disclosure have the ability to create uniform, homogeneously-shaped, discrete beads which give the desired color dot matrix images. These beads can be closely spaced, between 36-81 beads per square inch, without running together. Yet, each bead rounds to form a smooth, uniform bead shape. The craft paint, in order to provide this key feature, must have sufficient flow resistance so that the beads will not run together to form a continuous surface, but still have adequate fluidity to form a uniform, homogeneously-shaped bead. The "balance" between these two characteristics enables the craft paint to form uniform, homogeneous, and discrete beads. This feature is provided by the addition of two important ingredients to the craft paint.

These key features are illustrated in FIG. 5. In FIG. 5(a), applicator 50 applies a bead 52 of the craft paint of the present invention onto surface S. As applicator 50 is withdrawn, shown in FIG. 5(b), the craft paint forms a small tail or curlicue 54 on bead 52. Tail 54 immediately begins to coalesce, as shown in FIG. 5(c), into bead 52 and the bead begins to form a smooth, rounded shape. Tail 54, within seconds, has coalesced into bead 52 to form a smooth, rounded shape, as shown in FIG. 5(d). The craft paint of the present invention forms beads such as shown in FIG. 5(d), with substantial regularity despite various angles of application and despite the speed or technique in which the applicator is withdrawn.

Applicant's craft paints are comprised of a major portion of a water-based acrylic copolymer and a minor portion of an additive formulation which imparts the desired rheological qualities to the paint bead. That is to say that the presence of the additive gives the overall paint formulation certain flow characteristics which promote the formation of the discrete, uniform, substantially hemispherical beads depicted in FIG. 2. These additives enable the craft paint to form discrete beads. That is to say that, these additives enable the craft paint beads to flow easily out of an applicator and then stabilize without interfering with other beads. Yet, the paint in each bead will still flow into a smooth, rounded bead as shown in FIG. 5.

In some of the more preferred embodiments, the first type of additive is a thickener. These additives include two different hydroxyethyl cellulose thickeners, each having differing viscosities, and a nonionic associative thickener. Preferably such a nonionic associative thickener will be a synthetic polyurethane polymer system. Such a polymer system contributes to the ease of flow of the craft paint out of the applicator. The polymer system also acts as a buffer for the two hydroxyethyl cellulose thickeners to bring out the flow characteristics of each. This blend of thickener agents with the polymer system contributes to the formation of a craft paint which will flow easily out of an applicator and then quickly gel to form a discrete bead. The blend causes the paint to remain fluid enough for the bead to coalesce and regularize its external surfaces as clearly illustrated in FIG. 5. It is to be expressly understood that this preferred embodiment is described for explanatory purposes only and is not meant to limit the scope of the inventive concept. Other additives may be used under the teachings of the present invention to help give the craft paint the desired viscosity characteristics described above.

The second type of additive introduced to the craft paint of the present invention enhances the capability of the craft paint to form uniform, homogeneously shaped beads. This additive increases the ability of the combination of thickening agents to quickly gel to enable the craft paint to form uniform, homogeneously-shaped beads. Most craft paints contain small amounts (typically 0.1 to 3% by weight) of ultrafine particles of insoluble inorganic materials to provide coloration. The craft paint of the present invention has ultrafine insoluble particles, preferably mica, in amounts about twice the normal range added to prior craft paint formulations (i.e., about 6.0% by weight).

The additional amounts of mica at least partially absorb the emulsifier in the paint to cause the paint to gel more quickly so as to form a bead. This provides the craft paint with the ability to form a smooth rounded bead regardless of the angle or rate of flow of application. Again, it is to be expressly understood that the preferred embodiment is described for explanatory purposes only and is not meant to limit the scope of the inventive concept. Other additives to the craft paint may be used under the present invention to enable the craft paint to have the appropriate viscosity and beading characteristics.

The craft paint of the present invention provides several other important features. For example, the craft paint of this patent disclosure is not tacky after drying so that the design will not be disrupted by contact with other surfaces. The craft paint is color-fast so that the design and the surface on which it is applied can be washed or cleaned without affecting the design. The colors of the craft paint are constant, i.e., the colors are substantially the same wet as they are dry. This allows the craft paint to be applied with confidence that the colors will remain coordinated after the craft paint has dried.

Another desirable feature of these craft paints is their ability to adhere to many different kinds of surfaces (including rough and smooth surfaces). For example, FIG. 6 illustrates the application of a craft paint bead 60 onto a fabric surface 62 having an underlying substrate 64 to form a strong adhesion to substrate 64 that will withstand repeated washing. The craft paint penetrates through surface 62 to bond 66 onto substrate 64. On the other hand, these craft paints also can be applied onto painted or vinyl surfaces, such as the flat hard surface 72 suggested in FIG. 7. That is to say that a craft paint bead 70 created by these formulations has the ability to bond 76 directly onto a flat hard surface 72 and adhere thereto.

The more preferred embodiments of the craft paints of the present invention are provided in a variety of different colors by using a variety of pigments at different ratios and levels. Each of these different colors of craft paints require different levels of pigment or types of pigments. These different levels and/or types of pigments will affect the viscosity and beading characteristics of the craft paint. In order to get substantially the same attributes and performance for each color of craft paint, the level of the thickeners and the pearlescent pigment is adjusted. This adjustment ensures that the beads of each color of craft paint are uniform and that the flow characteristics of each of colors of the craft paint are similar.

The composition of one highly preferred embodiment of a craft paint of the present invention is listed below. This composition is for a white craft paint composition. Other colors are substantially similar in composition.

A PREFERRED WHITE CRAFT PAINT COMPOSITION

| INGREDIENT | TRADE NAME & SUPPLIER | ATTRIBUTE | % WGT (wet) |
|---|---|---|---|
| Styrene Acrylic Copolymer | Rhoplex WL91 Emulsion Rohm & Haas Co. | Vehicle | 71.7267 (range between 64.00 to 79.00) |
| Mineral Oil, Nonionic Emulsifiers, High Flash Petroleum Derivative Blend | Nopco NDW Henkel Corp. | Defoamer | .3021 (range between .27 to .33) |
| Propylene Glycol | Union Carbide Corp. | Freeze-thaw stabilizer | 7.1089 (range between 6.30 to 7.80) |
| Butyl Carbitol | Union Carbide Corp. (premixed with Propylene Glycol) | Coalescent Agent | 2.7404 (range between 2.40 to 3.00) |
| Alkoxyated Alkyphenol | Paraplex WP-1 Rohm & Haas Co. | Plasticizer | 9.8390 (range between 8.00 to 11.00) |
| Hydroxyethyl Cellulose | QP100,000H Union Carbide Corp. | Thickener (High viscosity) | .0513 (range between .04 to .06) |
| Hydroxyethyl Cellulose | QP52,000H Union Carbide Corp. | Thickener (Medium viscosity) | .0472 (range between .04 to .05) |
| Mica (70%) coated with Titanium Dioxide (30%) | The Mearl Corp. | Pearlescent Pigment | 6.4117 (range between 5.4 to 7.3) |
| Synthetic Polyurethane Polymer System | DSX1550 Henkel Corp. | Nonionic Associative Thickener | .2266 (range between .19 to .26) |
| 1-(3-chloroally)-3,5,7-triaza-1-azonia-adamantane, sodium bicarbonate | Dowicil 75 Dow Chemical | Preservative | .3749 (range between .33 to .41) |

In preparation, propylene glycol is premixed with the butyl carbitol, hydroxyethyl cellulose is premixed with water (about 0.6 percent by weight of the total mixture) and the preservative is premixed with water (about 0.5 percent by weight of the total mixture) to form slurries for ease of preparation of the craft paint. The process of creating the above-described paint composition is standard in the field, similar to the formation of other craft paints.

It is to be expressly understood that craft paints utilizing other ingredients and ranges of ingredients in order to achieve the above-stated characteristics, particularly the beading characteristics, are within the scope of the present invention.

The combination of the two thickeners of different viscosity in the present invention, as described above, improves the viscosity and the stabilization of the craft paint while retaining controllable flow characteristics. The viscosity of the craft paint of the present invention is within the range of 13,000 to 20,000 centipoise, measured according to Brookfield RVT #6 spindle at eighty degrees fahrenheit. These features enable the craft paint to be easily applied to form a discrete bead that stabilizes without interfering with adjacent craft paint beads while forming a smooth, rounded shape. The thickener agents of the craft paint of the present invention provide a craft paint which will flow easily out of an applicator in a uniform, controllable flow and which then form a discrete homogeneously-shaped bead. The thickener agents described above are blended together to perform these characteristics.

The increased amounts of mica, in addition to functioning as pearlescent, cause the craft paint to form into a smooth, rounded, spherical shape with regularity. The mica enhances the ability of the craft paint to gel to form the shape of the bead. The excessive amounts of mica over what is conventionally used functions to partially absorb the emulsifier from the craft paint vehicle. This enables the craft paint to coalesce into a uniform, homogeneous, rounded, and spherical bead as shown in FIG. 5.

These two characteristics, the ease of flow and the stable gel action of the craft paint, enable the craft paint to be applied in uniform, homogeneous discrete beads to form a color dot matrix pattern closely spaced together which visually merges to form solid lines or fields of color having a high degree of visual resolution and color saturation.

3. Coded Pattern

The present invention provides a unique system for coded patterns which can be easily used to create designs, easily transferred to a desired surface, and easily understood by a user understanding the same color symbols. Beautiful intricate color dot matrix designs exhibiting three-dimensionality and high color saturation can be created by users in time frames an order of magnitude less than the time required to create comparable needlecraft designs.

a. Pattern Spacing

The craft paint system of the present invention provides a coding pattern to assist an individual in creating a stylized design such as design 14 in FIG. 1.

Figure 8:
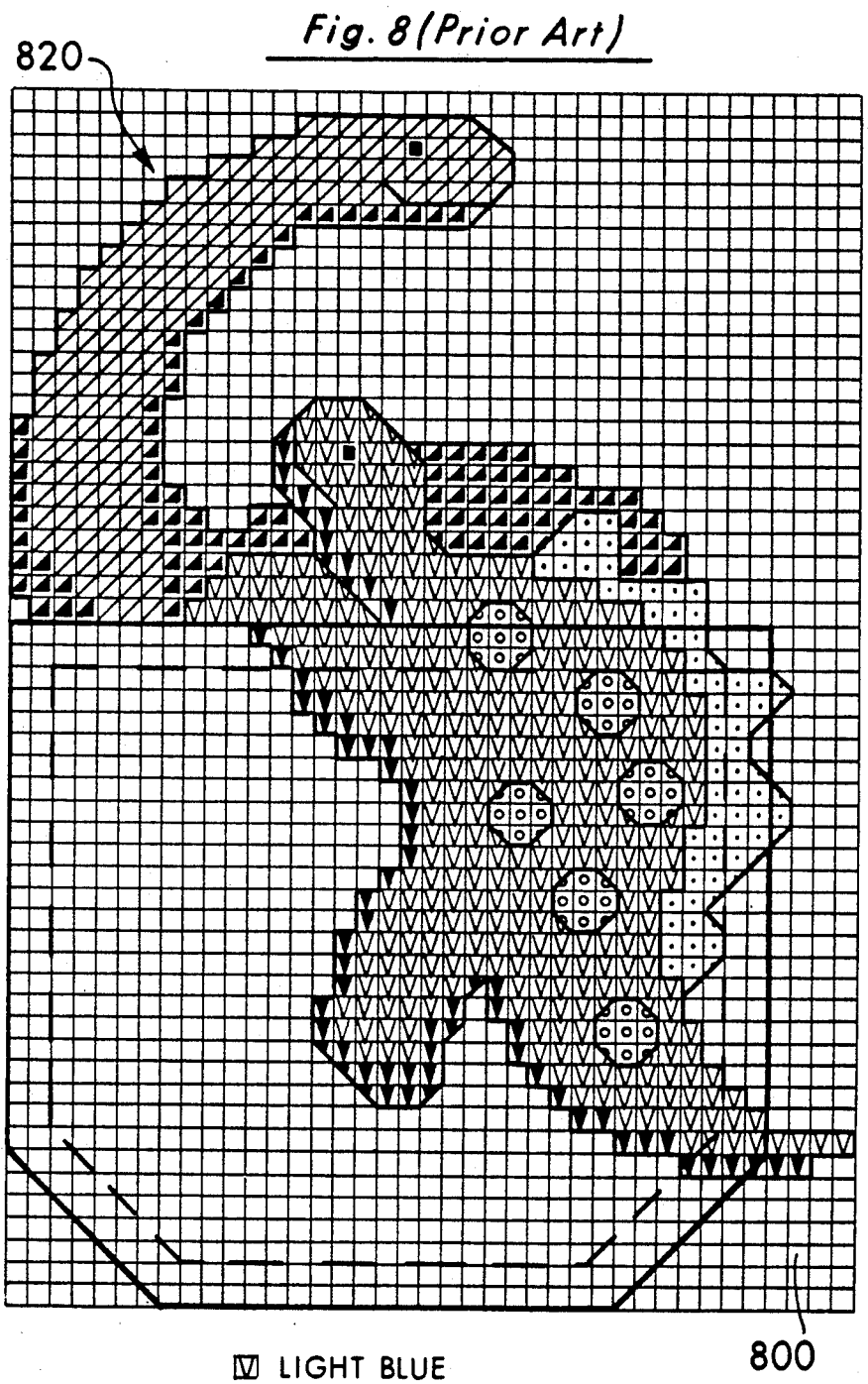
FIG. 8 sets forth a prior art coding pattern for needlepoint using square grids.

The coding patterns of the prior art, such as the coding pattern illustrated in FIG. 8, are formed in a grid array of squares 800. A chart 810 of symbols usually accompanies each different pattern and, as mentioned, the chart may use different symbols for different colors as the pattern changes. These patterns using squares, although adequate for use with needlepoint, have a number of problems in use with craft paint. The craft paint forms a circular bead which is difficult to apply regularly to squares. Moreover, the total surface of the square cannot be filled without the craft paint running into the adjacent square's bead of craft paint. The extraneous background material must be carefully trimmed out of a transfer design in order not to show up on the painting surface. Curved lines can only be formed in a staggered, stairstep pattern, since squares cannot be arrayed to form a smooth curvilinear line. The entire process using these patterns is tiring. The pattern must first be sized according to the desired application. The design then must be carefully cut-out to trim off the extraneous background. Then the pattern must be glued onto the application surface and left in place for at least 12 hours. This process is unpleasant for the user and detracts from the craftwork experience.

The coding patterns of the present invention constitute an array of circles, rather than squares which are used in prior art matrix pattern crafts, such as needlepoint or cross-stitch. These circles are sized and spaced apart in a predetermined count per inch on suitable transfer material or on a desired surface.

Figure 9A:
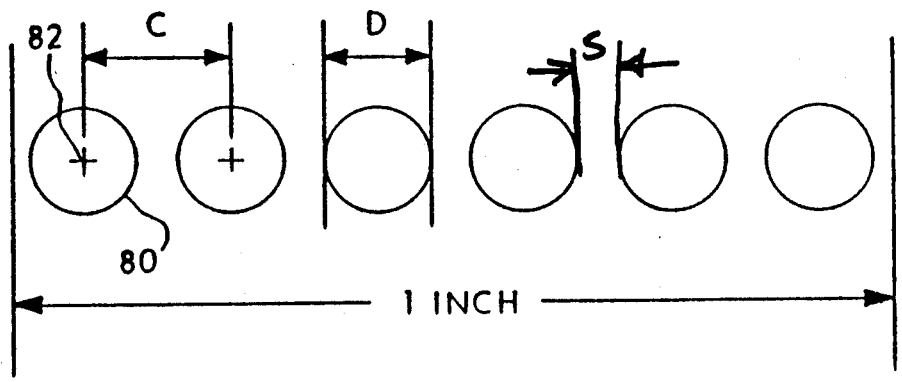
FIG. 9(a) sets forth the use of circles to create a straight line created under the teachings of the present invention.
Figure 9B:
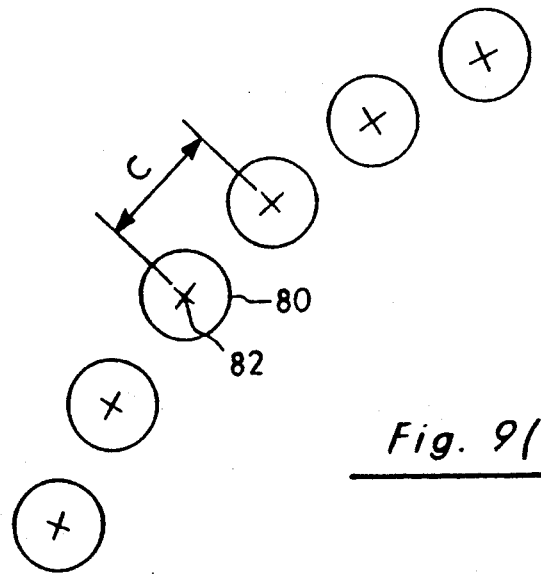
FIG. 9(b) sets forth the use of circles to create a curved line under the teachings of the present invention.
Figure 10:
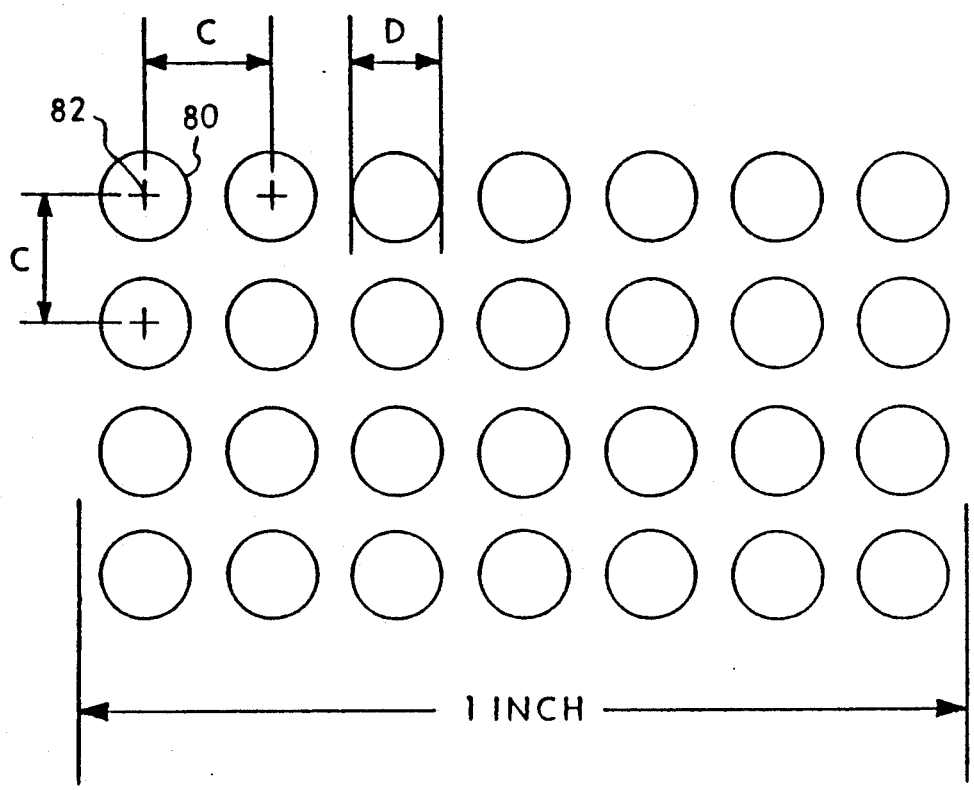
FIG. 10 sets forth the use of circles to create a regular grid under the teachings of the present invention.

The unique circles of the present invention shown in FIGS. 9-10 provide several advantages. A circle 80 provides a non-visual center point 82 for the user to clearly target the fine tip of the applicator when applying a bead of craft paint. The user points the tip of the applicator to the center 82 of the circle 80. The circles also provide a clear guide for the size of the bead of paint to be applied. The user continues to apply the craft paint until the circle is filled. Also, circles 80 allow a design to follow a smooth curved line as illustrated in FIG. 9(b) rather than requiring a stepped pattern as do patterns following a conventional needlecraft grid array. For example, see the stepped neck 820 of the dinosaur in FIG. 8. The circles 80 can also be spaced in a nested array (FIG. 11) rather than a grid array (FIG. 10).

In the preferred embodiment, circles 80 are spaced in a single line as shown in FIGS. 9(a) and 9(b) in a range of 4.5 to 8.5 circles per linear inch (as measured from center points 82 of each circle). The diameter D of each circle 80 is in a ratio to the center point spacing of about 1/1.2 C to 1/2.4 C (or about 0.8 C to 0.4 C). For example, if the count density $C_D$, where $C_D = 1/C$, is six circles per linear inch, then the diameter of the circles would be about:

$$D = (1/1.2)(1 \text{ inch}/6) = (0.83)(0.167 \text{ inch}) = 0.14 \text{ inch}$$

This diameter D is slightly larger than ⅛ inch. The spacing S is determined by $(1.0 - C_D D)/C_D$, or $C - D$, which for the above example:

$$S = [1.0 - 6(0.14)]/6 = [1.0 - 0.84]/6 = [0.16]/6 = 0.03 \text{ inches}$$

Figure 11:
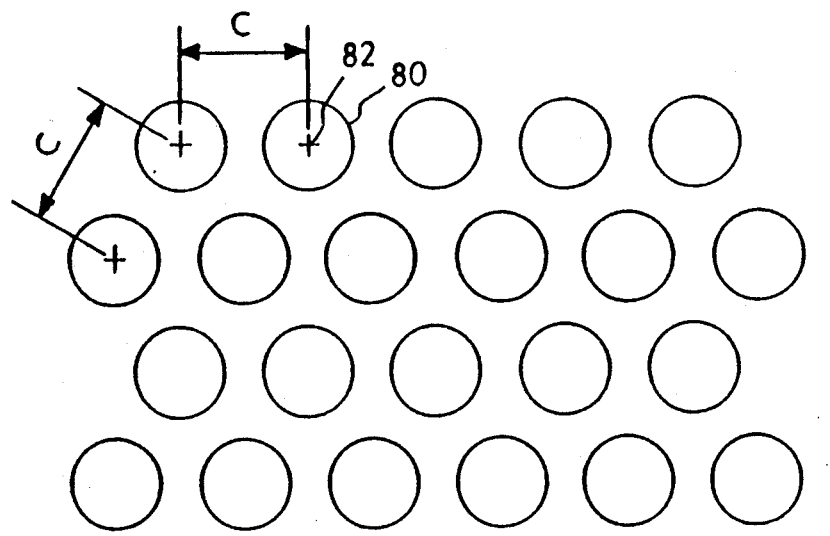
FIG. 11 sets forth circles to create a nested grid under the teachings of the present invention.

For adjacent lines of circles as shown in FIGS. 10 and 11, the preferred count range of circles 80 is in a range of 6 to 9 circles per linear inch (36 to 81 circles per square inch). If the circles are spaced closer than nine circles per linear inch, the craft paint beads may tend to connect together or the beads may become so small that the design and color level become too subdued and the height dimensional look is lost. In FIG. 11, the circles 80 are nested while maintaining the spacings S. This results in a greater density than the configuration of FIG. 10. In this environment, the preferred density is in a range of 6 to 9 circles per linear inch or 36–81 beads per square inch. If the circles are spaced so there are less than six circles per linear inch, the color density of the pattern becomes gross and the pattern loses definition.

The circles 80 of the present invention function to provide a vehicle for carrying a color symbol (discussed next) which provides a convenient target for centering the applicator tip. The circles when used in the above predetermined spacing and diameter relationships enable the creation of designs in patterns having straight and curved lines of painted beads and/or grids and nests of painted beads.

b. Color Symbols

Figure 13:
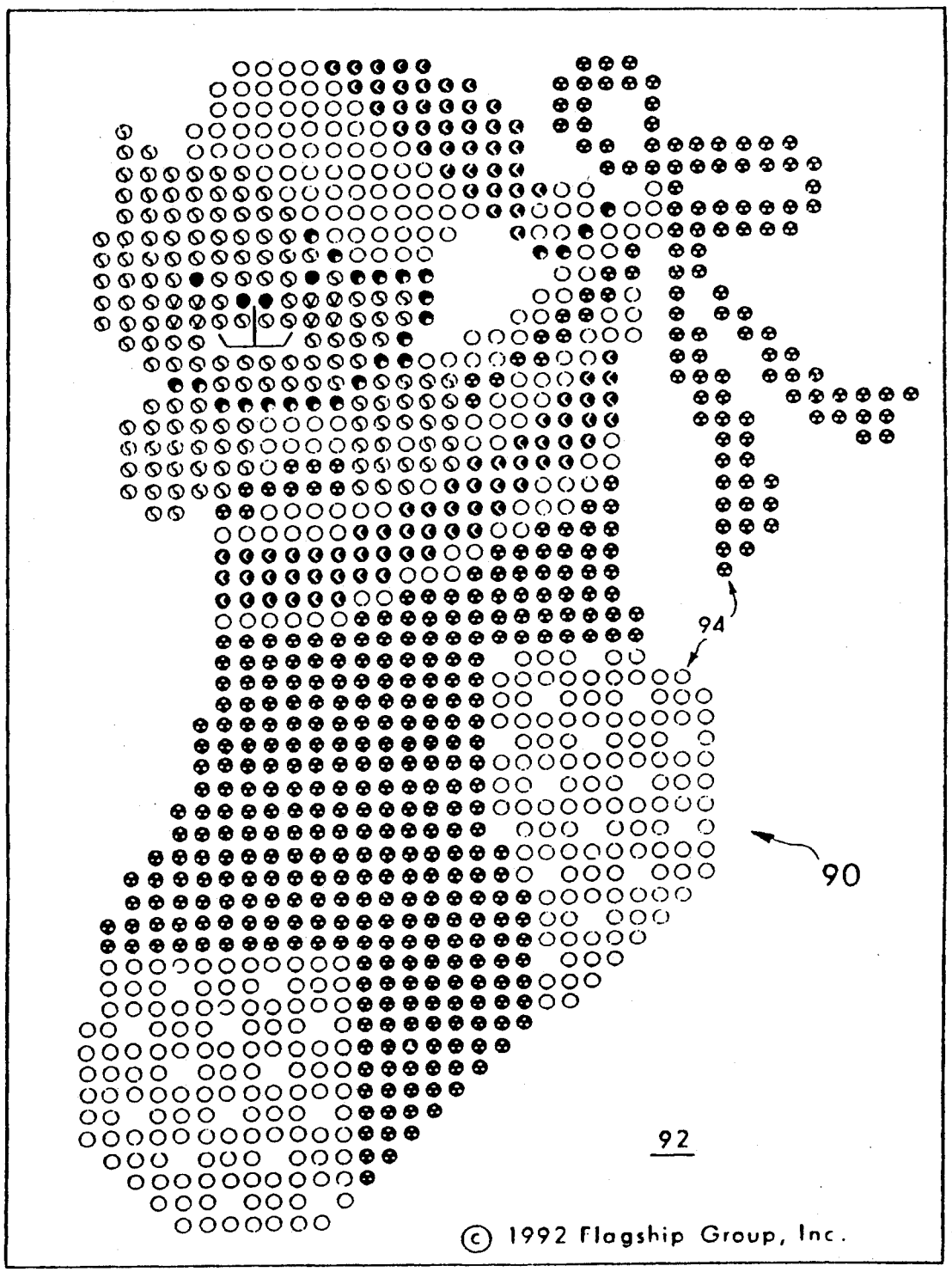
FIG. 13 sets forth the illustration of a design using the circles containing the color symbols under the teachings of the present invention.
Figure 14:
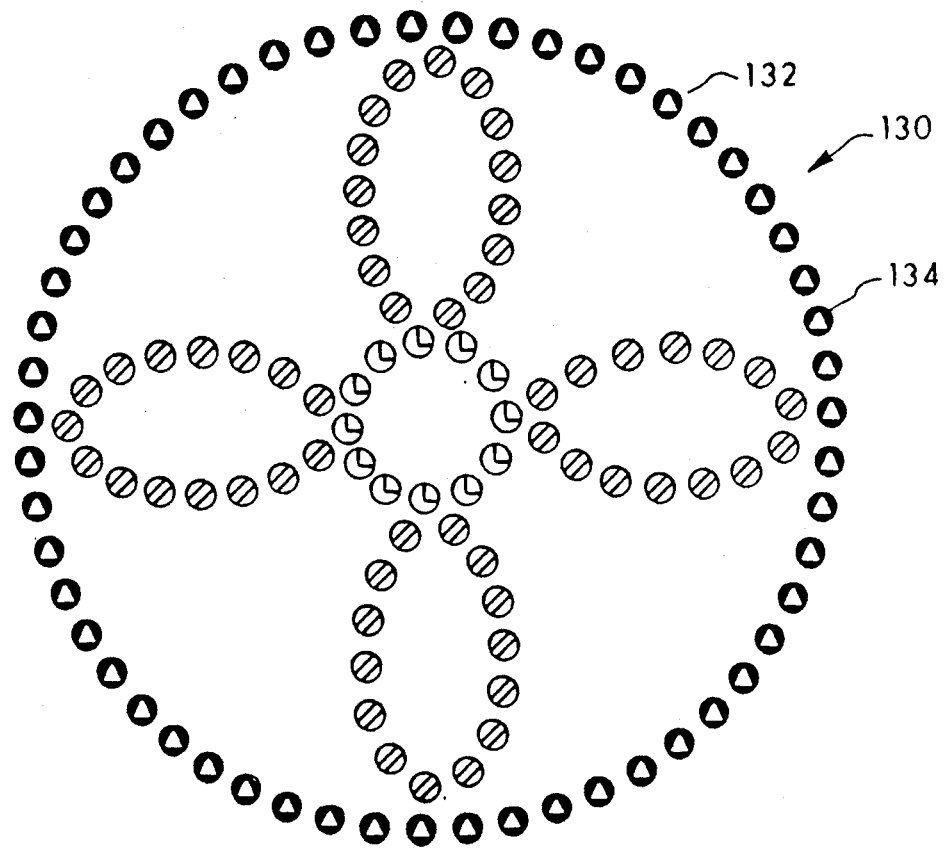
FIG. 14 sets forth a second illustration using the circles containing color symbols for a design created under the teachings of the present invention.

A unique feature of the coded patterns of the present system is the use of a universal set of color symbols to indicate the desired colors. Each symbol always ties to the same color, so the designer and user need learn only one set of symbols. In the prior art matrix design crafts such as cross-stitch or needlepoint, new color codes are created for each design or leaflet of designs. In the present invention, each circle 80, as shown in FIGS. 12-14, is provided with a symbol 84 as to the color of craft paint to be applied in that circle. Each symbol 84 represents a specific craft paint color as illustrated in the table in FIG. 12. Moreover, each color's symbol is provided with a darkness value to correspond with the darkness value of the assigned color.

The symbols 84 range in darkness value according to the relative darkness of not only the different colors but also to the shades of each different color. In FIG. 12, snow white is indicated by a clear circle and black by a totally darkened circle to indicate the terminal ends of the darkness value. The symbols for the yellow colors 86 are generally lighter in contrast to the symbols for the green colors 88. Also, the symbols for each individual shade of each color have a darkness value according to the relative darkness of each shade. For instance, the symbol code 84 for Celery Green is lighter than the symbol for Forest Green.

The symbols 84 of FIG. 12 also provide another function which allows the user to better perceive the individual shades of a color by using a uniquely different design for the symbols. Many patterns will have shades of a basic color such as shades of green 88, as shown in FIG. 12. By having the different shades 88 of green represented with different designs, even though side-by-side on a pattern, the user can easily differentiate and identify the shades in a side-by-side relationship. This will be more fully discussed in the next section.

The use of the color code 84 of the present invention: (1) enables the coded design to be easily discernable, (2) enables the user to visualize the design prior to applying the craft paints, (3) provides symbol codes that are uniform, i.e., the symbol codes are the same for each design. This latter feature means that only one color coding scheme will need to be learned by the pattern designer and the user. Moreover, the symbol codes can be indicated directly on the craft paint applicator bottle and packing to further aid the user.

c. Pattern Design

Examples of the patterns of the system of the present invention containing designs are illustrated in FIGS. 13 and 14. The pattern 90 of FIG. 13 is printed directly onto the transfer sheet or desired surface 92. Unlike prior art matrix craft patterns, the pattern 90 of the present system does not have any extraneous background grids so the transfer surface 92 will not display excess materials. The pattern 90 in FIG. 13 uses stepped circles 94 according to a grid array (FIG. 10) to simulate a needlecraft-type design. The individual circles 94 are coded to indicate colors set forth in the table of FIG. 12. The use of symbols having darkness values according to the relative darkness of the colors enables the design of a kitten in a Christmas sock to be clearly discernable.

Pattern 130, shown in FIG. 14, illustrates circles 132 arranged in smooth curvilinear lines (FIG. 9(b)). Again, there is no extraneous background material to detract from the design 130. The circles 132 are coded for the desired color to be applied. Circles 134 are coded for avocado green, etc. A user can quickly visualize the finished design 130.

It is to be expressly understood that the symbol designs 84 in FIG. 12 represent an artistic expression of the color protected by copyright laws. Any design 84 can be authored and the invention contained herein is independent of the actual artistic designs shown.

4. Craft Paint Applicator

Figure 15:
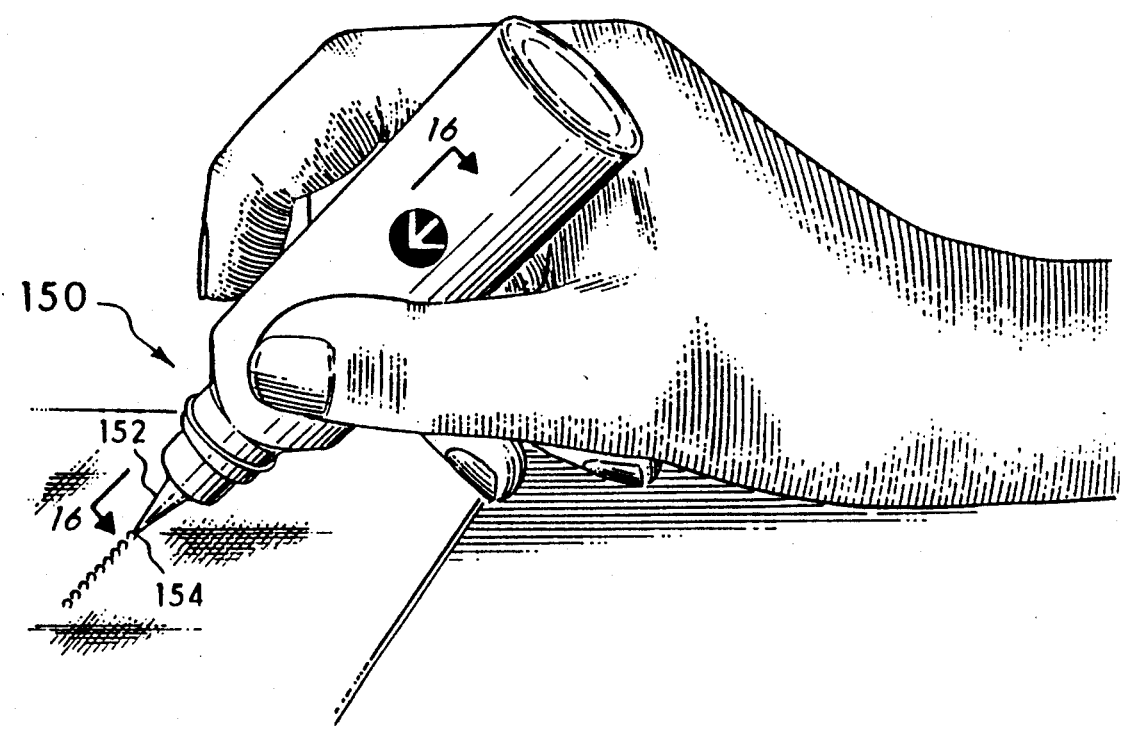
FIG. 15 sets forth the application of the craft paint of the present invention to a surface.
Figure 16:
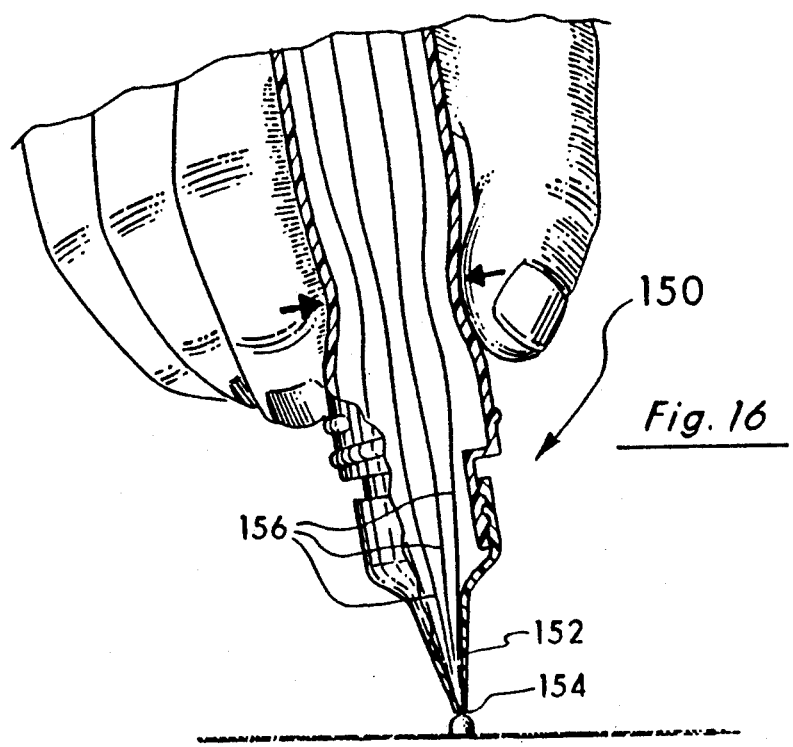
FIG. 16 sets forth, in partial cross-sectional view, the construction of the applicator bottle of the present invention.
Figure 17:
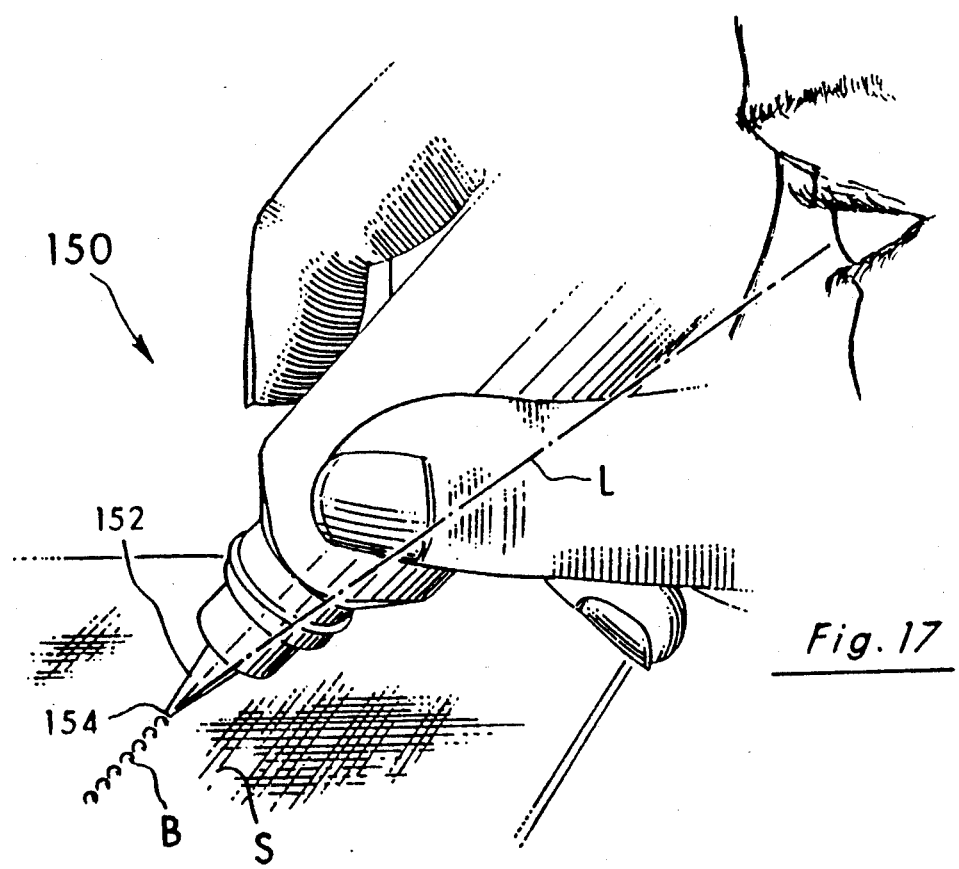
FIG. 17 illustrates the application of the beads of the present invention to a surface.

The craft paint of the present system is applied onto the desired surface by a fine-tipped craft paint applicator, such as applicator 150 illustrated in FIGS. 15-17. In order to create the uniform, homogeneously-shaped discrete beads of paint in a specific pattern, applicator 150 has a fine tip. A fine-tipped applicator for use in the present system includes a tip having a dispensing end surface outside diameter less than 0.060 inches. Conventional applicator tips having an outside diameter greater than 0.060 inches are not able to provide fine tip application. The sidewalls of the applicator tip, in order to have an adequate inner orifice for flow purposes, are in the range of 0.005 to 0.015 inches. These ranges provide an applicator having a sufficiently fine tip to enable a user to precisely apply the craft paint in a narrowly-spaced (6-9 circle counts per linear inch) pattern. Also, the line-of-sight of the user, as indicated by line L in FIG. 17, is enhanced by the use of fine-tipped applicator 150. The user is able to directly see the point at which the bead B from dispensing end 154 of applicator tip 152 makes contact with application surface S.

The other important features of the craft paint applicator of the present system include the formation of laminar flow 156 through the applicator tip and the minimization of air bubbles in the craft paint flow. The fine tip 152 of craft paint applicator 150, shown in FIG. 16, in the preferred embodiment, is designed to form the craft paint in laminar flow as indicated by the flow lines 156. The applicator tip of the present invention preferably has smooth interior walls to eliminate the opportunity for turbulent flow to occur.

Holder 160, shown in FIGS. 18-19, includes a frusto-conical shape having an exterior wall portion 162 and inner sidewalls 164. The lower end of exterior portion 162 of cap holder 160 forms a circular base 168 to support cap holder 160 on a surface S. The upper circular end 170, shown in FIG. 19, of holder 160 includes an interior portion 172 forming a cap portion which extends downward into a formed interior cavity 163 formed by sidewalls 164.

Applicator 150 is always maintained in an inverted position by holder 160 when sold, used and stored. The craft paint is kept in fluid contact with the inner surfaces of the applicator tip by gravity flow. This prevents the formation of air pockets between the craft paint and the applicator tip. The formation of air bubbles in the craft paint is thus minimized if not eliminated. Another important benefit from the inverted position of the applicator is the prevention of air circulation within the dispensing end. Since the fluid craft paint is always in contact with the inner surfaces of the applicator tip, there is no opportunity for air to circulate within the dispensing end 154 of applicator tip. This eliminates any drying of craft paint within the applicator tip and the problems associated therewith are not present.

The inverted position of applicator 150 ensures that the applicator is always in a ready-to-use position. Since the craft paint is always in contact with the applicator tip, there is no need to wait for the craft paint to flow downward as in the prior applicators. Also, the user does not need to wait for air bubbles to dissipate in the craft paint, since there are no air bubbles present. This allows a much faster and efficient application process to speed the creation of a stylized design.

5. Process of Using the Craft Paint System

The craft paint system of the present invention provides a process for a user, with little or no experience, to quickly and easily create a stylized color dot matrix design having a finely-detailed, three-dimensional appearance on a variety of surfaces. The system uses the above-described components, including the novel craft paint composition, circle coding pattern and craft paint applicator, in combination.

In use, the user chooses the desired design from a selection of patterns. A designer can create a number of designs for patterns all based on the single standard set of symbols and the space circles. There is no need, as found in needlecraft, for users to learn different color symbols for different designs. The appropriate craft paints are selected according to the codes on the pattern. The pattern is transferred onto the application surface, by heat transfer or other well-known techniques. After the pattern has been transferred, the user can begin painting the design. In some applications the pattern may be printed on the desired surface. A first-time user will normally become rapidly proficient with the craft paint application with only a minimal amount of practice, typically less than an hour.

Once the pattern is transferred, the user can begin applying the beads of craft paint onto the pattern. First, the user will examine the circles in the area where the design is to be initiated for the explanatory color symbol. Then the craft paint applicator containing the craft paint corresponding to that code is easily selected since, as shown in FIG. 15, the color symbol appears prominently on the side of the bottle or packaging.

Next, the dispensing end 154 of the applicator tip of the selected craft paint applicator is targeted to the center point 82 of the circle 80 on which the craft paint is to be applied. A bead of craft paint is formed on that circle. The size of the bead is controlled by the amount and time of pressure applied against the applicator by the user's hand. The user will quickly be proficient at controlling the applicator to create the appropriate sizes of beads corresponding to the circles on the pattern. The diameter of the bead D (FIG. 2a) overlays the circle 80 and symbol 84. The craft paint will forgive most discrepancies in application technique as long as the bead is the appropriate size. The user can quickly move on to the next circle to efficiently create the design. If a mistake is made, the user simply waits a few hours until the bead has partially dried but not yet cured and permanently attached and remove the mistake with tweezers or other implements.

A colorful and finely-detailed color dot matrix design can be created at a rate of 2 to 3 minutes per square inch, or about one-tenth the time a similar design would be created by needlecraft. This increases the aesthetic pleasure of creating the design since the design takes shape in a short period of time.

The system of the present invention is thus able to provide the items necessary for a user having little experience to create a finely-detailed design having a dimensional appearance. It is to be expressly understood that the above-described system and process is for explanatory purposes only. For example, the circles could be of any independent geometric shape which does not touch the adjacent shape such as octagons, hexagons, parenthesis, etc. Other variations and embodiments of the system, the components including the craft paint, the coding pattern and the applicator, and the process of creating the designs using such a system are considered to be within the scope of the inventive concept.

What is claimed is:

1. A craft art system for forming a three-dimensional color dot matrix design onto a surface, said system comprising:
   at least one colored craft paint material having the characteristics of providing a discrete, uniform, homogeneous bead when applied onto said surface;
   a pattern of circles for providing said design on said surface onto which said at least one paint material can be applied, said pattern of circles being provided in a density in the range of about 4.5 to 8.5 circles per linear inch in a line and 36 to 81 circles per square inch in an array;
   a color symbol formed in each said circle for identifying said at least one paint material; and
   a fine-tipped applicator having a dispensing end with an outside diameter less than about 0.060 inches for applying said at least one paint material onto said surface in said discrete, uniform, homogeneous beads overlaying said circles to form said three-dimensional color dot matrix design.

2. The system of claim 1 wherein said system further comprises:
   means for holding said fine-tipped applicator in an inverted position when not in use to minimize the formation of air bubbles in said colored craft paint material.

3. The system of claim 2 wherein said applicator holding means include:
   a cap removably affixed to said applicator; and
   a holder formed around said cap for holding said applicator and said cap in a substantially vertical position with said applicator tip extending downward so that the craft paint in said applicator bottle flows downward against said applicator tip and any air contained in said applicator bottle stays against the end of said applicator bottle away from said applicator tip; said holder including:
   a base portion having a diameter substantially equal to the largest diameter of said applicator bottle to provide stability in holding said applicator and said cap in said substantially vertical position;
   an upper portion;
   an interior cavity formed in said upper portion and extending downwardly therein;
   a threaded portion formed in said interior cavity for engagement with said threaded portion on said applicator bottle;
   a first portion on said threaded portion for engaging said applicator tip in said downwardly extending position for temporarily holding said applicator; and
   a second portion on said threaded portion for engaging said applicator tip in said downwardly extending position for storing said applicator; and
   an inner end wall formed in said interior cavity for engaging said dispensing end of said applicator tip to prevent leakage of craft paint out of said applicator.

4. The system of claim 1 wherein said at least one paint material further includes a craft paint formulation comprised of:
   (a) an acrylic copolymer which constitutes from about 64 to about 79 percent by weight of the craft paint formulation;
   (b) a thickening agent which constitutes from about 0.27 to about 0.37 percent by weight of the craft paint formulation, and wherein said thickening agent is, in turn, comprised of:
   (i) a medium viscosity hydroxyethyl cellulose which constitutes from about 0.04 to about 0.05 percent by weight of the craft paint formulation;
   (ii) a high viscosity hydroxyethyl cellulose which constitutes from about 0.04 to about 0.06 percent by weight of the craft paint formulation; and
   (iii) a nonionic thickener which constitutes from about 0.19 to about 0.26 percent by weight of the craft paint formulation; and
   (c) an ultrafine insoluble material which constitutes about 5.4 to about 7.3 percent by weight of the craft paint formulation.

5. The system of claim 4 wherein said ultrafine insoluble material includes mica which constitutes about 6.4 percent by weight of the craft paint formulation.

6. The system of claim 4 wherein said medium viscosity hydroxyethyl cellulose has a viscosity of about 52,000 centipoise and constitutes about 0.05 percent by weight of the craft paint formulation;
   said high viscosity hydroxyethyl cellulose has a viscosity of about 100,000 centipoise and constitutes about 0.05 percent by weight of the craft paint formulation; and
   said nonionic thickener includes synthetic polyurethane polymer system and constitutes about 0.22 percent by weight of the craft paint formulation.

7. The system of claim 1 wherein said dispensing end has:

sidewalls formed in the range of about 0.005–0.015 inches.

8. A pattern on a surface carrying a design, said pattern comprising:
   (a) a plurality of spaced circles forming said design, said plurality of spaced circles having a count density $C_D$ of about 4.5 to 8.5 circles per linear inch when formed in a continuous line with each of said spaced circles having a diameter D between about 0.8 C to 0.4 C, where C is the center point spacing equal to the inverse of the count density, each of said spaced circles in said continuous line having a spacing S between adjacent circles wherein $S = C - D$;
   (b) a plurality of symbols, each of said symbols assigned to represent a different color;
   (c) each of said symbols having a darkness value corresponding to the darkness of the assigned color; and
   (d) each of said plurality of spaced circles containing one of said symbols, said design in said pattern on said surface being visually represented by said amount of darkness of one or a plurality of said contained symbols in said plurality of spaced circles.

9. A color coded craft paint system for creating decorative matrix designs, said system comprising:
   a plurality of patterns, each of said patterns carrying a unique design,
   a plurality of colored craft paints,
   a plurality of bottles, each one of said plurality of bottles containing a different one of said plurality of paints,
   a set of symbols, each symbol in said set of symbols assigned to identify a different one of said plurality of colored craft paints, each of said symbols having a darkness value corresponding to the darkness of the assigned color,
   a plurality of spaced geometric shapes forming each said unique design, said plurality of spaced geometric shapes having a count density of about 4.5 to 8.5 spaced geometric shapes per linear inch when said spaced geometric shapes are adjacent to each other,
   each of said plurality of spaced geometric shapes containing one of said symbols in said set, each of said unique designs in said plurality of patterns being visually represented in degrees of darkness by said darkness value of said one or a plurality of said contained symbols in said plurality of spaced geometric shapes before the assigned colored craft paint identified by the aforesaid contained symbols is applied from said plurality of bottles, each said unique design in said plurality of patterns being visually represented in color when the assigned colored craft paint is applied to cover the geometric shape containing the symbol identifying the aforesaid craft paint.

10. A craft art system for forming a three-dimensional color dot matrix design onto a surface, said system comprising:
    at least one colored craft paint material having the characteristics of providing a discrete, uniform, homogeneous bead when applied onto said surface;
    a pattern of geometric shapes for providing said design on said surface onto which said at least one paint material can be applied, said pattern of geometric shapes being provided in a density in the range of about 4.5 to 8.5 geometric shapes per linear inch in a line and 36 to 81 geometric shapes per square inch in an array;
    a color symbol formed in each said geometric shape for identifying said at least one paint material; and
    a fine-tipped applicator having a dispensing end with an outside diameter less than about 0.060 inches for applying said at least one paint material onto said surface in said discrete, uniform, homogeneous beads overlaying said geometric shapes to form said three-dimensional color dot matrix design.

* * * * *

UNITED STATES PATENT AND TRADEMARK OFFICE
CERTIFICATE OF CORRECTION

PATENT NO. : 5,209,663  
DATED : May 11, 1993  
INVENTOR(S) : Reed N. Wilcox; et al It is certified that error appears in the above-indentified patent and that said Letters Patent is hereby corrected as shown below:

In the drawings, FIG. 12, delete "Turquois" and substitute --Turquoise--

Column 1, line 43, delete "enjoy" and substitute --enjoys--

Column 1, line 43, delete "suffer" and substitute --suffers--

Column 3, lines 9-10, delete "homogenous" and substitute --homogeneous--

Column 4, line 5, delete "for craft paint system patterns" and substitute --for a craft paint system pattern--

Column 4, line 29, delete "tend" and substitute --tends--

Column 10, line 8, delete "homogenous" and substitute --homogeneous--

Column 10, line 27, delete "craft" and substitute --craft paint--

Column 10, line 36, delete "homogenous" and substitute --homogeneous--

Column 11, line 24, delete "homogenous" and substitute --homogeneous--

Column 13, line 23, delete "require" and substitute --requires--

Column 13, line 31, delete "colors" and substitute --the colors--

Column 14, line 54, delete "functions" and substitute --function--

UNITED STATES PATENT AND TRADEMARK OFFICE
CERTIFICATE OF CORRECTION

PATENT NO. : 5,209,663
DATED : May 11, 1993
INVENTOR(S) : Reed N. Wilcox, et al

It is certified that error appears in the above-indentified patent and that said Letters Patent is hereby corrected as shown below:

```
          Column 19, line 19, delete "remove"
and substitute --removes--
```

Signed and Sealed this

Eighteenth Day of October, 1994

Attest:

BRUCE LEHMAN

Attesting Officer    Commissioner of Patents and Trademarks